Dec. 28, 1965 W. F. BEHR 3,226,146
FLUID SHOCK ABSORBING BUMPER
Filed April 18, 1963 2 Sheets-Sheet 1
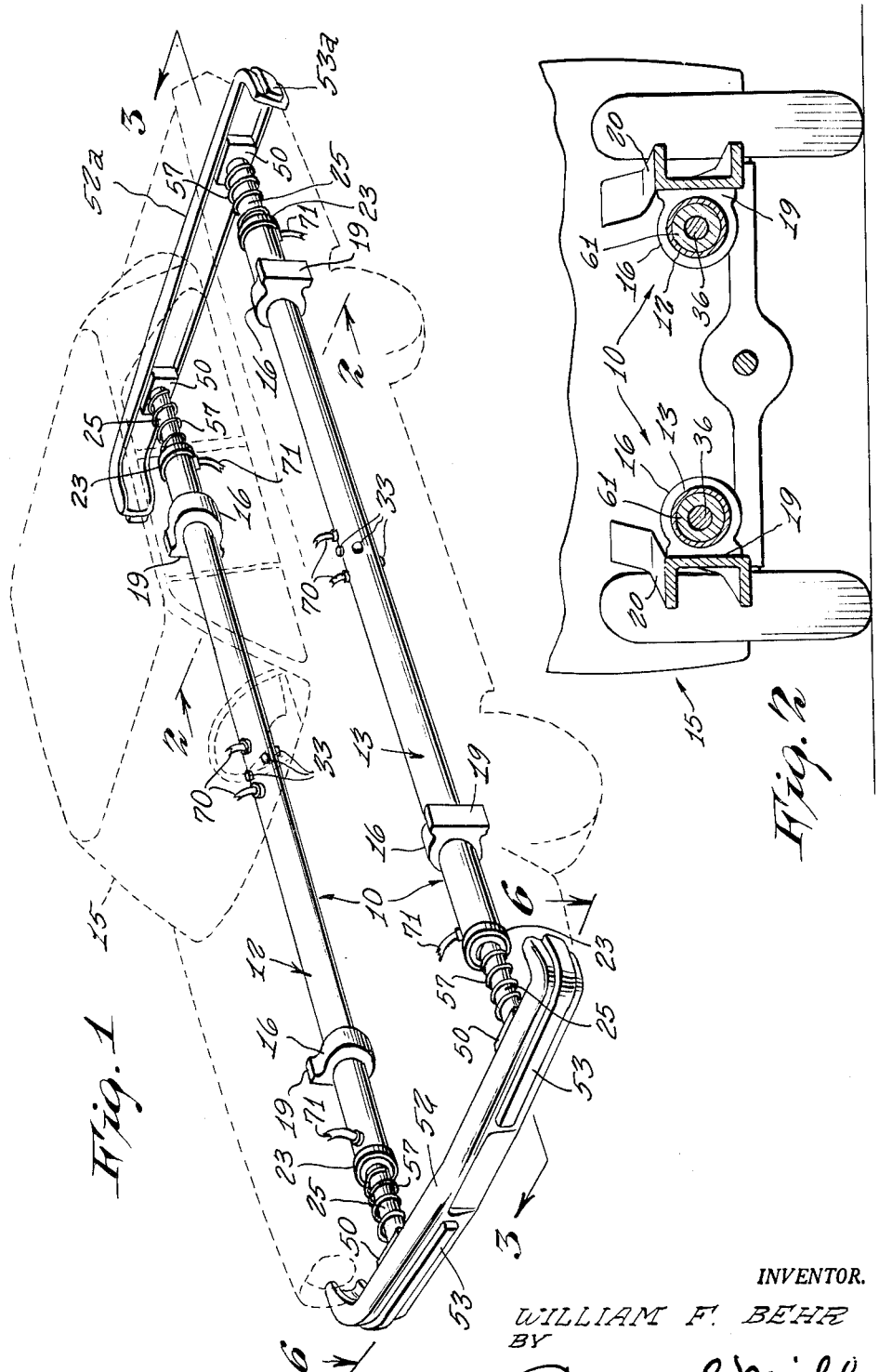
INVENTOR.
WILLIAM F. BEHR
BY
Carl Miller
ATTORNEY Dec. 28, 1965 W. F. BEHR 3,226,146
FLUID SHOCK ABSORBING BUMPER
Filed April 18, 1963 2 Sheets-Sheet 2
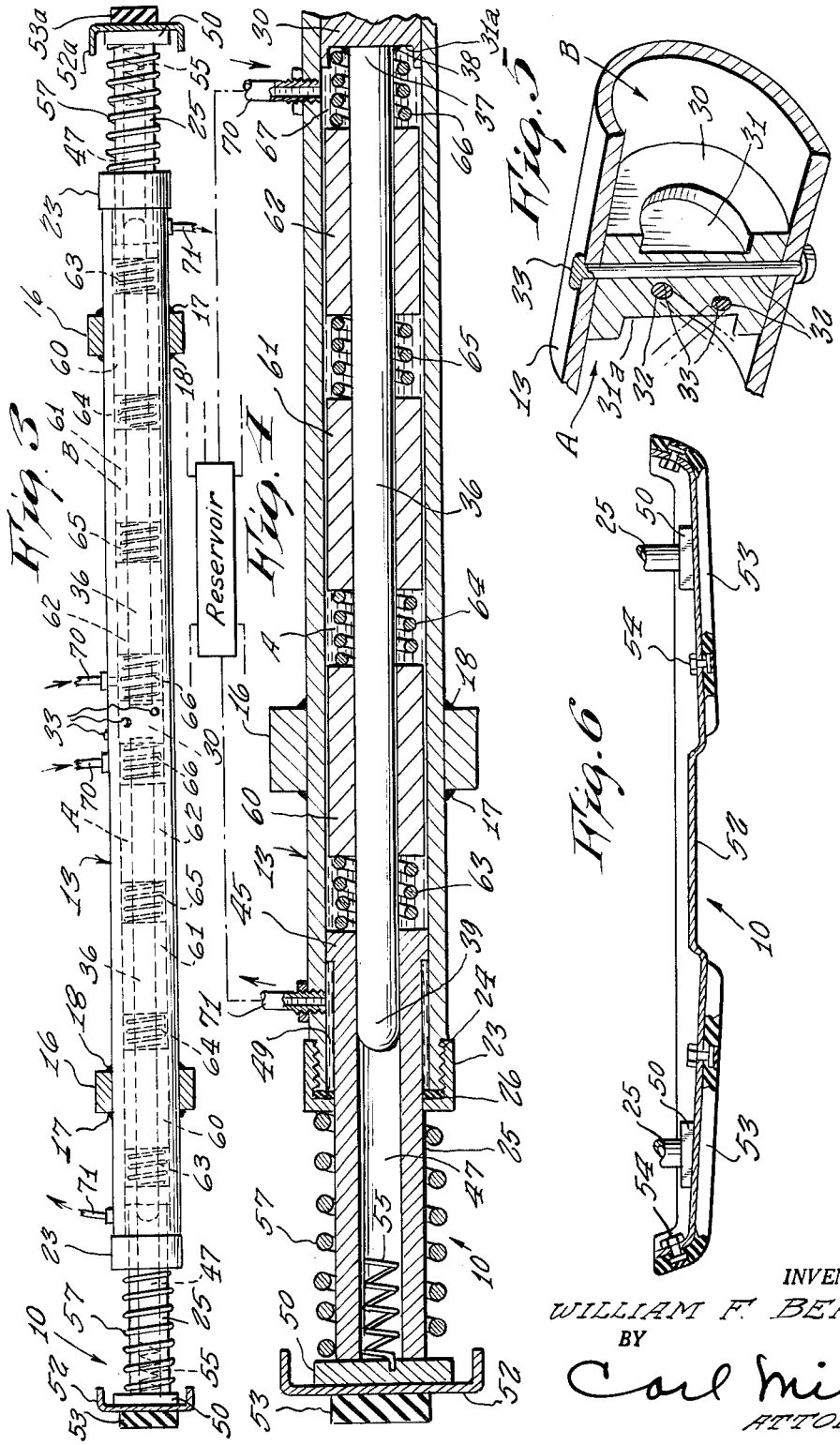
INVENTOR.
WILLIAM F. BEHR
BY
Carl Miller
ATTORNEY

3,226,146
FLUID SHOCK ABSORBING BUMPER
William F. Behr, Asbury Park, N.J.
(32—30 70th St., Jackson Heights, Queens 1, N.Y.)
Filed Apr. 18, 1963, Ser. No. 273,863
4 Claims. (Cl. 293—30)

This invention relates to a shock absorbing vehicle bumper.

The primary object of this invention is to provide a bumper structure which includes an elongated cylinder disposed one on each side of the vehicle chassis and extending from front to rear, each cylinder having a central abutment wall to define two independent cylinder chambers therein containing a plurality of spaced pistons with compression springs therebetween and the outermost pistons in each cylinder chamber having an outwardly projecting piston rod secured to the vehicle bumper, and a hydraulic system embodied in the bumper structure; the relationship of the parts being such as to provide a high capacity, high compression shock absorber for the front and rear bumpers of the vehicle and which will at the same time function to absorb light impact forces as well.

A further object of the invention is to provide a bumper structure of the above mentioned character which is simple in construction, inexpensive, strong and durable and further well adapted for the purpose for which it is designed.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings being a part of this application, and in which like designating reference numerals refer to corresponding parts throughout the several views.

FIGURE 1 is a perspective view of the bumper structure as applied to an automotive vehicle.

FIGURE 2 is a sectional view in line 2—2, FIGURE 1.

FIGURE 3 is a sectional view on line 3—3, FIGURE 1.

FIGURE 4 is a longitudinal detail sectional view of the structure of FIGURE 3.

FIGURE 5 is a detail sectional view of the mid-portion of the structure of FIGURE 3.

FIGURE 6 is a sectional view of the front vehicle bumper taken on line 6—6, FIGURE 1.

The bumper structure 10 comprises two identical elongated cylinders 12 and 13 extending substantially the full length of the chassis (not shown) of the vehicle 15, see FIGURE 1. The cylinders 12, 13 are of uniform diameter throughout and are each provided adjacent an end with a bracket 16, permanently secured to the cylinder by welding as at 17, 18, see FIGURES 3 and 4. Each bracket 16 has a flat base portion 19 for attachment to a chassis channel bar 20. The cylinders 12, 13 are formed of high strength steel to withstand the high pressures that will develop in use of the bumper structure. Each cylinder at each end is provided with a cap 23 threaded to the cylinder end as at 24 and including an axial bore for a piston rod 25, to be hereinafter described and a packing seal 26 to effect a fluid tight seal with the piston rod.

Provided centrally within each cylinder is a partition 30 of substantial width, as shown in detail in FIGURE 5. The partition 30 is of disc form having a snug fit within the cylinder and is adapted to be inserted therein and removed from either end thereof. On each face of the partition 30 there is provided a circular recess 31, 31a respectively. Formed in the partition 30 are a plurality of angularly related bolt receiving openings 32 some of which are at least diametral with respect to each other. Corresponding registering bolt receiving openings are provided in the center portion of each cylinder wall. With the partition 30 placed in position the same is rigidly secured to the cylinder by bolts 33, there being a bolt for each opening, thus providing an exceedingly strong connection of the partition to the cylinder which divides the same into two equal size front and rear cylinder chambers A and B.

Arranged axially within each cylinder chamber A, B is an axial guide rod 36 the inner end 37 of which is rigidly secured in any desired manner to the partition 30. Viewing FIGURE 4 it will be seen that the inner end of the guide rod 36 seats within the circular recess 31a of the partition and is secured thereto by the weld 38. Optionally the guide rod may be secured to the partition by a threaded connection in the manner well known. The outer end 39 of the guide rod 36 is rounded and terminates short of the corresponding end of the cylinder chamber as clearly shown in FIGURE 4.

Positioned for sliding movement on the outer end portion of each guide rod 36 is a piston 45 having a piston rod 25 that projects outwardly of the cylinder cap 23, the piston rod 25 further provided with an axial bore 47 into which the guide rod 36 slidably telescopes, see FIGURE 4. The piston rod 25 is of a diameter less than the internal diameter of the cylinder chamber A so as to provide an annular chamber 49. The outermost ends of corresponding piston rods 25 are each provided with an attachment plate 50 suitably secured thereto and to which plate the front bumper bar 52 is connected in any desired manner. Preferably the outer face of the bumper bar 52 is provided with rubber cushion guards 53 secured to the bumper bar 52 by bolts 54. The rear bumper bar 52a is similarly attached to its corresponding piston rods and is also provided with rubber cushion guards 53a.

Located within the axial bore 47 of each piston rod 25 is a short cushion spring 55 suitably secured to the attachment plate 50 to engage the end of the guide rod 36 when the piston rod 25 moves inwardly into its cylinder chamber under impact. Surrounding the piston rod 25 is a compression spring 57 seated at its ends respectively on the attachment plate 50 and cylinder cap 23. The spring 57 is preferably of the variable pitch variable rate type capable of absorbing a range of light to heavy impacts.

Disposed within each cylinder chamber and slidable on the guide rod 36 therein are three axially spaced pistons 60, 61, and 62. Compression coil springs 63, 64 and 65 are positioned on the guide rod 36 and arranged respectively between pistons 45, 60, 61 and 62. A compression spring 66 also positioned on the guide rod 36 is disposed in the chamber 67 between piston 62 and the partition 30, the end of the compression spring 66 adjacent the partition being seated in the circular recess 31a, see FIGURE 4.

Preferably the compression springs 63, 64, 65 and 66 are respectively of progressive greater strength such as to progressively come into play dependent on the severity of the impact on the bumper bar.

To provide an additional shock absorbing effect and at the same time lubricate the several pistons in each cylinder chamber the end chamber 67 is connected by a conduit 70 to an oil reservoir as shown in FIG. 4. Similarly the annular chamber 49 is connected by a conduit 71 to the same oil reservoir. Each of the pistons is of a diameter such as to provide a very slight clearance between the same and the cylinder wall. This will permit a metering effect in the movement of the pistons in the cylinder chamber.

It will be seen that the bumper structure will not only function to absorb light impacts but also heavy impacts with attendant benefits to the vehicle and its occupants. Under the most heavy impact with all the compression coil springs going solid the pistons 25 attached to the bumper bar receiving the impact will move about 10 inches. Under impact it will be seen that the oil or fluid of the hydraulic system will flow through conduits 70 into the reservoir while at the same time oil will flow from the reservoir into the annular chamber. Also oil will flow past the pistons in a direction towards the annular chamber under a metering action. Thus in addition to the shock absorbing action of the compression springs there will be the shock absorbing action of the hydraulic system. Upon cessation of the impact the parts will return to their original position due to the expansion of the springs, which return will be gradual and without shock as there will be the same metering action along with the forced flow of oil out of the annular chamber 49 through conduit 71 in the direction of the arrow, see FIGURE 4; the oil from the reservoir at the same time flowing into the end chamber 67 from conduit 70, in the direction of the arrow.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, what I claim as new and desire to secure by Letters Patent is:

1. A vehicle bumper structure comprising:
   (a) an elongated tubular housing,
   (b) bracket means for mounting said housing on a vehicle chassis part,
   (c) an abutment partition fixedly secured within said housing to define, at one side thereof, a cylinder having a closed inner end,
   (d) an axial guide rod within said cylinder fixedly secured at its innermost end to said abutment partition,
   (e) a combined piston and piston rod within the outer end portion of said cylinder slidably mounted on the outermost end portion of said guide rod and defining with said cylinder an annular chamber,
   (f) a bumper bar,
   (g) an attachment plate secured to the outer end of said piston rod including fastening means for securing said plate to said bumper bar,
   (h) a sealing cap on the end of the housing opposite said abutment partition through which cap said piston rod extends,
   (i) a plurality of axially spaced floating pistons slidably positioned on said guide rod and each said floating piston being so dimensioned as to provide a slight clearance with the cylinder wall and with the endmost floating pistons spaced respectively from said combined piston and piston rod and said abutment partition,
   (j) a compression coil spring arranged between adjacent floating pistons and surrounding said guide rod,
   (k) a compression coil spring similarly arranged respectively between the endmost floating pistons and said combined piston and piston rod and said abutment partition,
   (l) a compression coil spring surrounding said piston rod between the bumper bar and said sealing cap,
   (m) a reservoir containing hydraulic fluid,
   (n) separate conduits each connecting respectively said annular chamber and the space between the innermost floating piston and abutment partition to said reservoir whereby to provide an hydraulic shock absorbing system operative under impact on said bumper bar to cause fluid to flow from the space between the innermost floating piston and said abutment partition into said reservoir and from said reservoir into said annular chamber, and the clearance between said floating pistons and cylinder wall providing a metering effect of the fluid towards the annular chamber as the floating pistons move toward the abutment partition.

2. The vehicle bumper structure of claim 1, wherein:
   (a) said piston rod is provided with an axial bore extending the full length thereof, telescopically receiving said guide rod,
   (b) a cushion spring in said axial bore secured to said attachment plate,
   (c) said compression springs within said cylinder being each of progressively greater strength towards said abutment partition, and
   (d) said compression spring surrounding said piston rod being a variable rate spring.

3. The vehicle bumper structure of claim 2, wherein:
   (a) each said elongated tubular housing extends substantially the full length of a vehicle chassis,
   (b) said abutment partition being positioned centrally within said housing and defining a second cylinder with a closed inner end at the other side of said abutment partition,
   (c) said second cylinder including parts identical with the parts as provided in said first mentioned cylinder, and a pair of separate conduits similarly connecting said second cylinder to said reservoir, and
   (d) a second bumper bar connected to the outer end of the piston rod of said second cylinder.

4. The vehicle bumper structure of claim 3, including:
   (a) a second elongated tubular housing having two cylinders and associated parts all identical with that of said first mentioned elongated tubular housing,
   (b) said housings being arranged one on each side of the vehicle chassis,
   (c) a pair of separate conduits similarly connecting each cylinder of said second housing to said reservoir, and
   (d) the outer ends of the piston rods extending axially from the opposite ends of said second housing being attached respectively to said first mentioned and second bumper bar.

References Cited by the Examiner

UNITED STATES PATENTS

| | | | |
|---|---|---|---|
| 365,939 | 7/1881 | Post. | |
| 1,438,177 | 12/1922 | Hatashita | 293—86 |
| 1,618,419 | 2/1927 | Flach | 293—86 |
| 2,202,050 | 5/1940 | Gibbons | 293—85 |
| 2,461,066 | 2/1949 | Kent. | |
| 2,977,146 | 3/1961 | Edwards et al. | 293—60 |

FOREIGN PATENTS 267,209   3/1927   Great Britain.

ARTHUR L. LA POINT, *Primary Examiner.*

LEO QUACKENBUSH, EUGENE G. BOTZ,
*Examiners.*